United States Patent [19]

Stover et al.

[11] Patent Number: 5,468,814
[45] Date of Patent: Nov. 21, 1995

[54] POLYMERS HAVING OXIDIC FUNCTIONALITY AND DERIVATIVES THEREOF

[75] Inventors: Harald D. H. Stover, Dundas, Canada; Pei Li, Kowloon, Hong Kong; Lorenzo Ferrari, Sarnia, Canada; Robert T. Shaver, Brantford, Canada; Djordje Vlaovic, Winnipeg, Canada

[73] Assignee: Research Corporation Technologies, Inc., Tucson, Ariz.

[21] Appl. No.: 306,332

[22] Filed: Sep. 15, 1994

Related U.S. Application Data

[62] Division of Ser. No. 968,803, Oct. 30, 1992, Pat. No. 5,376,732.

[51] Int. Cl.$^6$ .................................................... C08F 8/06
[52] U.S. Cl. ......................... 525/390; 525/398; 525/419; 525/437; 525/480
[58] Field of Search .................................... 525/390, 398, 525/419, 437, 480

[56] References Cited

U.S. PATENT DOCUMENTS 3,474,159  10/1969  Juveland et al. .
4,453,016   6/1984  Au et al. .

FOREIGN PATENT DOCUMENTS 2182928  5/1987  United Kingdom .

OTHER PUBLICATIONS

Raghavendrachar, P. et al., "Liquid–Phase Catalytic Oxidation of p–Xylene," *Ind. Eng. Chem. Res.* 31, 453–462 (1992).

Hronec, M. et al., "Kinetics and Mechanism of Cobalt–Catalyzed Oxidation of p–Xylene in the Presence of Water," *Ind. Eng. Chem. Process Des. Dev.* 24, 787–794 (1985).

Borgaonkar, H. et al., "Liquid Phase Oxidation of Toluene to Benzaldehyde by Air," *Ind. Eng. Chem. Prod. Res. Dev.* 23, 455–458 (1984).

Hendriks, C. et al., "The Oxidation of Substituted Toluenes by Cobalt (III) Acetate in Acetic Acid Solution," *Ind. Eng. Chem. Proc. Res. Dev.* 17(3), 256–260 (1978).

Hendriks, C. et al., "The Kinetics of the Autoxidation of Aldehydes in the Presence of Cobalt(II) and Cobalt(III) Acetate in Acetic Acid Solution," *Ing. Eng. Chem. Prod. Res. Dev.* 17(3), 260–264 (1978).

Ferrari, L. et al., "Cobalt–Catalyzed Oxidation of Poly(4–methylstyrene)," *Macromolecules* 24, 6340–6342 (1991).

Hanotier, J. et al., "Effect of Strong Acids on the Oxidation of Alkylarenes by Manganic and Cobaltic Acetates in Acetic Acid," *J. Chem. Soc., Perkins Trans.* 2, 381–383 (1973).

Okada, T. et al., "The Liquid–phase Oxidation of Methylbenzenes by the Cobalt–Copper–Bromide System," *Bull. Chem. Soc. Jpn.* 54, 2724–2727.

Harustiak, M. et al., "Kinetics and Mechanism of Cobalt Bromide Catalyzed Oxidation of p–Xylene in the Presence of Phase Transfer Catalysts," *J. Mol. Catal.* 53(1), 209–217.

*Primary Examiner*—Bernard Lipman
*Attorney, Agent, or Firm*—Scully, Scott, Murphy & Presser

[57] ABSTRACT

Disclosed are polymers comprising phenyl rings pendant from the polymer chains or incorporated therein, wherein the phenyl rings are substituted with aldehyde and/or carboxylic acid functionalities and/or derivatives thereof. Also disclosed is a catalytic oxidation process for producing such polymers from precursor polymers containing benzylic carbon atoms.

17 Claims, No Drawings

POLYMERS HAVING OXIDIC FUNCTIONALITY AND DERIVATIVES THEREOF

This is a divisional of application Ser. No. 07/968,803, filed on Oct. 30, 1992, now U.S. Pat. No. 5,376,732.

BACKGROUND OF THE INVENTION

The present invention relates to functional low-molecular-weight, medium-molecular-weight, and high-molecular-weight polymers, both crosslinked and uncrosslinked, and in particular to low-molecular-weight and medium-molecular-weight polymers. More particularly, the present invention relates to such polymers substituted with oxidic moieties, namely aldehyde and/or carboxylic acid and/or hydroxymethyl functionality and/or derivatives thereof, wherein the oxidic carbon is alpha to a phenyl ring which is pendant from the polymer backbone or to a phenyl ring which is itself incorporated within repeating units of the polymer backbone.

A need exists in the art for polymers having the foregoing characteristics and in particular for a technique for forming such polymers which satisfies the objectives of satisfactory yield and rate, flexibility in the degree of oxidation and in the final molecular weight achieved by the technique, avoidance of hazardous reagents and reaction conditions, and relative ease and economy of operation.

There has now been discovered a new class of polymers and new materials derivable therefrom, as well as a process for producing such polymers which meets all of the foregoing objectives.

SUMMARY OF THE INVENTION

One aspect of the present invention comprises a polymer comprising phenyl rings from which are pendant one or more substituents having one or more of the structural formulas —C(O)R, —C(O)OR, —C(O)O(Cat), —C(O)NHR, —CH$_2$OC(O)R or —CH$_2$—OR, and, optionally, one or more substituents having the formula —CH$_2$R$^1$, wherein (Cat) is an alkali metal cation, R is —H or a straight or branched alkyl group containing 1 to 10 carbon atoms which is optionally substituted with —OH, —Cl, —CN, or —COOH, and which optionally contains a —O— or —C(O)— or —O—C(O)— or —C(O)—O— linkage, and R$^1$ is —H or a straight or branched alkyl group containing 1 to 10 carbon atoms which is optionally substituted with —OH, —Cl, —CN or —COOH and which optionally incorporates a —O— or —C(O)— or —O—C(O)— or —C(O)—O— linkage.

Another aspect of the present invention comprises a process for selectively oxidizing primary and/or secondary benzylic carbon atoms in a precursor polymer containing such benzylic carbon atoms, comprising reacting oxygen with said precursor polymer in a solution comprising said precursor polymer and an effective amount of a catalyst for said oxidation, under conditions effective to oxidize at least a portion of said benzylic carbon atoms. Primary and secondary benzylic carbon atoms are oxidized preferentially with respect to tertiary carbon atoms that may be present, and primary benzylic carbon atoms are oxidized preferentially with respect to secondary carbon atoms.

The novel polymers and process of the present invention realize a heretofore unprecedented combination of a substantial degree of oxidation within the polymer, along with substantial control over said degree of oxidation, substantial control over the molecular weight of the oxidized polymers, and substantial control over the distribution of oxidic functionalities within the polymer.

The variety of materials that can be produced via techniques incorporating the oxidation process described herein find utility in a wide variety of applications including but not limited to adhesives, compatibilizers for polymers and especially for blends of diverse polymers, thermoplastic elastomers, lubricant viscosity modifiers and lubricant dispersants, stabilizers for liquid/liquid and solid/liquid emulsions and dispersions, antifouling agents, oil field flooding additives, chromatographic supports, ion exchange resins, flocculants, polymeric imaging agents and photoresists, polymeric coatings, films and membranes, telechelic polymers and oligomers having ketone or alcohol end groups or end groups derived therefrom, including but not limited to acrylate or methacrylate or vinyl benzene groups.

DETAILED DESCRIPTION OF THE INVENTION

The present invention embraces a wide variety of polymers. Included are polymers having a backbone from which the phenyl rings having the indicated oxidized functionality are pendant, as well as polymers in which phenyl rings having oxidized functionalities are incorporated in repeating units in the main chain of the polymer.

Referring first to the polymers from which the phenyl rings having oxidized benzylic functionality are pendant, substituents with the oxidized functionality are herein referred to as X$^1$ and have the formula —Ph—X, wherein Ph is phenyl. The phenyl rings Ph can carry substituents in addition to —X, preferably acetyl, halo (especially —Cl), —COOH, or alkyl containing 1 to 20 carbon atoms. The substituent X can include unoxidized groups —CH$_2$R$^1$, and includes those groups which are formed by the novel catalytic process described herein, namely —C(O)H, —C(O)OH, and —C(O)R$^1$ as well as groups which can be derived therefrom (as described elsewhere herein). The preferred R$^1$ is —H or alkyl containing 1 to 8 carbon atoms, and more preferably R$^1$ is —H.

Polymers of this type within the scope of this invention include homopolymers, by which is meant polymers wherein essentially every repeating unit is substituted with an X$^1$ group. Typically, and preferably, the repeating units in such "homopolymers" have the formula —(CH$_2$CHX$^1$)—. As well, polymers of this type within the scope of this invention include copolymers, by which is meant polymers wherein only some of the repeating units are oxidized.

Polymers within the present invention also include those having polycarbonate, polyamide or polyester units, such as those of the formula Q, by which is meant repeating units of the formula —(C(O)—Q$^1$—C(O)NH—Q$^2$—NH—), —(C(O)—Q$^1$—C(O)O—Q$^1$—O)—, —(OC(O)OQ$^1$)—, —(C(O)—Q$^1$—NH)— or —(C(O)—Q$^1$—O)— wherein Q$^1$ and Q$^2$ are independently alkylene, phenyl, phenylalkylene, or alkylene-phenyl-alkylene, "alkylene" in each occurrence denoting straight or branched alkylene groups containing 1 to 16 carbon atoms. The group —X$^1$ can be pendant from the alkylene (or, as described hereinbelow, the phenyl moiety can be substituted with —X).

Polymers in accordance with the present invention may also comprise ethylenic repeating units, such as —CH$_2$CHZ$^1$— or —CH$_2$CZ$^1$Z$^2$— units, wherein Z$^2$ is —H and Z$^1$ is preferably selected from —H, —Cl, —CH$_3$, —OH, —COOH, —COO(lower alkyl) where lower alkyl is alkyl containing one to eight carbon atoms and especially methyl and ethyl, —O(O)CCH$_3$, —CN, or phenyl, or Z$^1$ and Z$^2$ are both —CH$_3$ or both —Cl. These will be recognized as derivatives of familiar monomers including ethylene, vinyl chloride, propylene, vinyl alcohol, acrylic acid, lower alkyl acrylates, and the corresponding methacrylates, especially methyl and ethyl acrylate and methacrylate, vinyl acetate, acrylonitrile, styrene, vinylidene chloride, and isobutylene. The homopolymers described in this paragraph may be oxidized to form lower molecular weight polymers and telechelics having functional endgroups. As well, the surfaces of films, fibers and other shapes of these polymers (and indeed of all carbon-based polymers having oxidizable groups in the backbone) may be oxidized using the process described herein, thereby introducing polar groups including but not limited to aldehyde, carboxylic acid and ketone.

Polymers within the scope of the present invention thus include copolymers in which units substituted with X$^1$, such as units of the formula Q(—X$^1$) or —CH$_2$CHX$^1$—, are interspersed along the backbone with units having one or more than one of the formulas Q, —CH$_2$CZ$^1$Z$^2$— or —CH$_2$CHZ$^1$— wherein Z$^1$ and Z$^2$ are as defined above. Also included are block copolymers wherein at least one portion of the polymer backbone comprises essentially no substituents of the formula X$^1$, preferably comprising instead at least one block composed of repeating units of one of the foregoing formulas Q, —CH$_2$CHZ$^1$— and/or —CH$_2$CZ$^1$Z$^2$—, and/or at least one block comprising different units of two or more of the formulas —CH$_2$CHZ$^1$— and/or —CH$_2$CZ$^1$Z$^2$— copolymerized together. Such block copolymers will also comprise one or more blocks having pendant substituents of the formula X$^1$, which blocks can be homopolymeric or interpolymeric with one or repeating units substituted with Z$^1$ rather than with X$^1$. Also included are block copolymers wherein at least one block of the polymer comprises monomeric units less sensitive to oxidation, such as but not limited to saturated hydrocarbons or methacrylic esters, and at least one block of the polymer comprises monomeric units more susceptible to oxidation, especially (but not limited to) alkylstyrene units. Preferred block copolymers have the formula A—B, A—B—A, or B—A—B, wherein B is a block substituted with X$^1$ groups and A is a block which is not substituted with X$^1$, although it will be recognized that many other block copolymeric structures are possible.

Also included in the scope of this invention are polymers characterized in that one portion of the polymer is a block of repeating units other than ethylenic, such as repeating units of the formula —(CH$_2$C(CH$_3$)=CHCH$_2$)—, or —(CH$_2$CH=CHCH$_2$)— wherein the double bonds have been hydrogenated prior to the oxidation described in the present invention; or —(C(O)Q$^1$C(O)NHQ$^2$NH)—, —C(O)Q$^1$C(O)OQ$^2$O)—, —(C(O)Q$^1$NH)—, —(C(O)Q$^1$O)—, —(OC(O)OQ$^1$)—, or —(CH$_2$CH(Alk)O)— wherein Alk in each unit is H or —CH$_3$.

Preferred polymers of the present invention include those containing one or more block portions which are relatively nonpolar, and one or more block portions having sufficient oxidic X$^1$ groups so as to be relatively polar.

Also included within the scope of this invention are polymers wherein the phenyl moiety having an oxidized benzylic functionality is present in the backbone of the polymer. Such polymers include homopolymers, by which is meant those in which essentially all of the polymer comprises repeating units of the general formula —Y$^1$—Ph(—X)—Y$^2$—, wherein X is —CH$_2$R$^1$, —C(O)H, —C(O)OH, or —C(O)R, or any of the groups derivable therefrom as described herein, and Y$^1$ and Y$^2$ are each independently a chemical bond, or a linking group including but not limited to —O—, —NH—, —C(O)—, —C(O)O(CH$_2$)$_{0-6}$—, —C(O)NH(CH$_2$)$_{0-6}$—, or an alkylene group (straight or branched) containing e.g. 1 to 10 carbon atoms. The phenyl rings Ph can carry substituents in addition to —X, preferably halo, especially chloro, —COOH, or alkyl containing 1 to 20 carbon atoms. One preferred example of such a polymer is poly(2,6-dimethyl-phenylene oxide), i.e. where in each repeating unit Y$^1$ is a chemical bond and Y$^2$ is —O—. Another preferred example is polyesters such as those in which Y$^1$ is —C(O)O— and Y$^2$ is —CH$_2$CH$_2$OC(O)—.

Also included within the present invention are polymers with repeating units of the type —Ph—Y$^1$—Ph—Y$^2$— where either Ph group or both Ph groups are substituted with —X and otherwise optionally substituted. One example of this type of polymer has the units of the formula —[O—Ph—C(CH$_3$)$_2$—Ph—OC(O)]—. Also included are polymers including polycarbonates, polyamides and esters having groups Q$^1$ (as defined herein) which include phenyl rings which are substituted with —X.

Other polymers of this type include copolymers in which repeating units incorporating in the backbone phenyl rings substituted with X are interspersed with units having one or more of the formulas Q, —CH$_2$CHZ$^1$— or —CH$_2$CZ$^1$Z$^2$— as defined above. Also included within the scope of this invention are block copolymers wherein one or more portions of the polymer comprises a homopolymeric block containing in the backbone phenyl rings substituted with X, or a copolymeric block containing in the backbone phenyl rings substituted with X and one or more other repeating units, and containing also one or more other blocks having no phenyl rings in the backbone which are substituted with X groups. Such other blocks can include repeating units of one or more of the formulas Q, —(CH$_2$CHZ$^1$)—, —(CH$_2$CZ$^1$Z$^2$)—, and/or —(CH$_2$CHX$^1$)—.

The molecular weight of the polymer produced in accordance with the present invention will generally be at least 1,000, and is preferably 20,000 or higher. It will be recognized that those of ordinary skill in this art can readily identify the polymerization conditions appropriate for producing polymeric products having the desired final molecular weight and molecular weight distribution, including selection of the appropriate structure and molecular weight of the precursor polymer which is then subjected to the oxidation reaction described herein, and including selection of the conditions for the oxidation reaction.

The polymeric products of the present invention are produced by the following process, which constitutes another novel aspect of the invention. The process comprises the selective oxidation in solution of primary and/or secondary benzylic carbon atoms, preferentially over tertiary carbon atoms, on a precursor polymer. The precursor polymer can be any polymer meeting the foregoing description of the polymeric products within the scope of this invention except that the precursor polymer comprises phenyl rings substituted width —CH$_3$ or —CH$_2$X. When the desired polymeric product is to possess oxidized functionality on phenyl groups pendant from the polymer, then the precursor polymer has the structure described above for the product polymer except that instead of the groups X$^1$ are groups of the formula —Ph—CH$_2$R$^1$ where Ph and R$^1$ have the meanings provided herein. In the precursor polymer, R$^1$ is preferably —H. When the desired polymeric product is to contain phenyl rings in the polymer backbone, the precursor polymer includes such phenyl rings substituted with —$CH_2R^1$, preferably with —$CH_3$.

The precursor polymers can be prepared by standard polymerization/copolymerization techniques familiar to polymer chemists. Preparation of precursor polymers which are homopolymers requires simply polymerizing a monomer having pendant —Ph—$CH_2R^1$ groups, or a monomer which upon polymerization yields a polymer having —Ph(—$CH_2R^1$) groups in the backbone. Similarly, precursor polymers can be prepared by copolymerizing mixtures of either of such monomers with one or more other monomers, or by separately polymerizing blocks of different compositions and then combining them in accordance with known procedures for forming a block copolymer such that at least one block contains primary and/or secondary benzylic carbons as described herein, or by sequentially polymerizing different monomers using living polymerization techniques familiar to practitioners in the field.

Polymers within the scope of the present invention include polymers which are crosslinked. Precursors of such polymers can be prepared by the well-known technique of including a crosslinking agent (such as divinylbenzene) with the monomer(s) and then polymerizing the resultant mixture. The crosslinked precursor polymer thus formed is then oxidized as described herein. Depending upon the density and other properties desired of the final polymer product, the amount of crosslinking agent is on the order of 2 wt. %, to produce a polymeric network useful for instance as a swellable bead, up to amounts on the order of 50 wt. % or even up to about 80 wt. % to produce a rigid, either dense or macroporous polymeric microparticle.

The process for preparing the polymers of the present invention requires a catalyst for the solution oxidation of the precursor polymer. Effective catalysis of the reaction is provided by the presence in the reaction solution of cobalt (II) ions together with a ligand which mediates the formation of a complex that contains cobalt (III) under the oxidative conditions disclosed herein. Without being bound by any particular mechanism and using as an illustration cobalt (II) bromide which is one effective catalytic material, the catalytic systems behave in a manner consistent with a mechanism in which Co(II)Br is oxidized to Co(III)Br, following which the ligand (here, Br—) transfers an electron to the cobalt (III) ion to become a bromine radical Br˙ which then abstracts a hydrogen radical preferentially from a primary benzylic position; the resulting benzyl radical is immediately quenched by molecular oxygen to benzyl peroxide, which decomposes to an aldehyde group or, on further oxidation, to a carboxylic group, and regeneration of Co(II)Br. Examples of ligands that are effective include halides, especially bromide and chloride; and zirconium acetylacetonate complex. These ligands can be supplied as cobalt(II) bromide, or they can be supplied as, for instance, the acetate, chloride, nitrate, or sulfate of cobalt (II) together with any of sodium bromide, sodium chloride, potassium chloride, and/or potassium bromide. Specific examples include, but are not limited to cobalt (II) acetate tetrahydrate/sodium bromide, cobalt (II) nitrate/sodium bromide, cobalt (II) chloride/sodium bromide $CoBr_2$, cobalt (II) acetate tetrahydrate/sodium chloride, and cobalt (II) acetate tetrahydrate/zirconium tetra(acetylacetonate). Other equivalent cobalt and halide compounds will be apparent.

The molar ratio of halide to cobalt in the reaction solution can vary widely, e.g. from 0.1:1 to 10:1, but the preferred ratio is about 1:1. For effective oxidation it is preferred to provide sufficient cobalt to correspond to a ratio of about 2.5 to about 30 mol % based on the number of sites on the precursor polymer to be oxidized.

Achieving the desired objective of maintaining the precursor polymer, the oxidized polymer, and the cobalt and halide ions in solution will usually require employing two co-solvents which, of course, must also be compatible and miscible with each other. One preferred class of co-solvents comprises one or more lower alkanoic acids, preferably acetic acid and/or propionic acid. The carboxylic moiety of such acids is believed to help form peroxide radicals which, in turn, are needed to initiate the cobalt-catalyzed oxidation. Without the acid, the polymer may suffer from extensive cross-linking and very low rates of oxidation. Examples of suitable solvents for dissolving the precursor and oxidized polymers include ketones such as methyl ethyl ketone, lower alkanols such as isopropanol and butanol, benzene, hexane, heptane, as well as octane and higher alkanes, and ethers, such as dimethoxyethane, diethylene glycol-dimethylether (diglyme), tetrahydrofuran, and 1,4-dioxane, provided that the co-solvent is capable of dissolving desired amounts of the precursor and product polymers and of the catalyst. The selection of both co-solvents and the relative amounts thereof is further subject to the proviso that the co-solvent does not inhibit the formation of the desired cobalt-halide catalytic complex. This selection is well within the capability of one of ordinary skill in this art, since it can readily be determined whether the complex has been established (from a deep blue or green color the reaction mixture exhibits, depending on the halide and solvents used) and whether the polymer is in solution. In general, effective solubilization has been realized using 10 to 60% acetic acid and 90–40% organic co-solvent. The preferred co-solvents are glacial acetic acid together with any of methyl ethyl ketone, dimethoxyethane, diethyleneglycol-dimethyl-ether, or heptane. The most preferred co-solvents are heptane with glacial acetic acid.

The oxidation is carried out by bubbling molecular $O_2$ through the reaction solution. The temperature of the reaction solution is preferably about 60° C. to 80° C., although it will be recognized that the preferred reaction temperature for the desired oxidation of a particular precursor polymer may vary somewhat but can readily be ascertained by following the description herein. The reaction has been carried out at temperatures as low as 40° C. though with reduced rates of oxidation. As the oxidation reaction is exothermic (produces heat), any scale-up, or increase of oxygen pressure or oxygen partial pressure above 1 atmosphere, or increase of reaction temperature, should be accompanied by the usual safety precautions in order to prevent runaway reactions with potential explosion hazards. Operating near the boiling point of the solvent mixture may reduce the solubility of oxygen and significantly reduce reaction rates.

The reaction proceeds gradually over a number of hours; it can be terminated after as little as 3 minutes or can be continued through 24 hours or more. The progress of the oxidation can be monitored easily during the operation, by NMR analysis of aliquots of the reaction solution. The conversions to —C(O)H and to —C(O)OH groups vary as a function of the duration of the oxidation; and so does the ratio of —C(O)H to —C(O)OH groups on the product polymer. Therefore, the duration of the oxidation reaction can be selected to provide the desired degree of conversion and the desired ratio of —C(O)H and —C(O)OH groups.

In general, the conversion of oxidizable groups to —C(O)H increases gradually over time to above about 5% and even above about 10%, and can even exceed about 12%, but does not generally exceed about 15%. The conversion of oxidizable groups to —C(O)OH also increases over time, but can exceed 5%, or 10% and reach over 20%, 25%, and even over 30% to 50% or higher. The total oxidation, measured as the percent conversion to —C(O)H plus the percent conversion to —C(O)OH, rises accordingly over time. Total oxidation can easily exceed 5% or 10% and can reach in excess of 25% and even 50%, 70%, or higher. Oxidation approaching 100% is possible, depending on the concentration of oxidizable sites on the precursor polymer and on the reaction conditions, but frequently oxidation-less than 100% will be sufficient. In such cases, a portion of the benzylic carbons of the formula —$CH_3$ or —$CH_2R$ will remain unoxidized and will be present on the final product polymer. Therefore, the final polymeric product can contain pendant groups of the formula —Ph—$CH_3$ or —Ph—$CH_2R$ when the phenyl rings are pendant from the polymer backbone, and of the formula —$CH_3$ or —$CH_2R$ when the phenyl rings are incorporated in the backbone.

The oxidized polymer can be isolated from the reaction solution by precipitation directly into a liquid in which the polymer is insoluble. Examples include precipitation into methanol or distilled water. The polymer can then be recovered by filtration. Redissolution into the co-solvent system or an equivalent solvent system and reprecipitation facilitates removal, if necessary, of residual trace amounts of the catalyst components.

If desired, the solvent into which the oxidized reaction mixture is precipitated can be selected for its ability to solubilize more or less of the more highly oxidized reaction products, thereby permitting fractionation of the reaction mixture. An example of this is the greater solubility of more highly oxidized polymers in methanol, compared to water. For instance, when 1.0 g of poly(4-methylstyrene) (Mn=10,700; Mw/Mn=1.44), 0.2 g of cobalt(II) acetate tetrahydrate and 0.3 g of sodium bromide were dissolved in a 3.5:1 (v/v) mixture of dimethoxyethane and acetic acid, and the mixture held at 60° C. while $O_2$ was bubbled through at about 0.5L/min for 24 hours, precipitation of the resultant reaction mixture into methanol yields 30% of a polymer showing 14% conversion to aldehyde functionality and 14% conversion to carboxylic acid (and a number average molecular weight of 11,800) whereas the filtrate still contained polymer exhibiting 11% conversion to aldehyde and about 50% conversion to carboxylic acid functionality (and a number average molecular weight of about 1,100).

An alternative technique for synthesizing polymers within the scope of the present invention is to oxidize benzylic carbon atoms of a precursor polymer as taught herein and thereafter to add to the thus-oxidized polymer another polymeric block or blocks of any of the types of polymer described herein. In other words, the catalytic solution oxidation and isolation are not necessarily the last steps in the polymer synthesis.

The following examples will illustrate the present invention as applied to the oxidation of poly(4-methylstyrene). These examples are in no way to be construed as limiting. Rather, these examples will illustrate the effects of varying reaction conditions on the oxidation.

EXAMPLE 1

8.0 grams of poly(4-methylstyrene) (molecular weight (MW)=13,600) and 0.8 grams of a 1:1 molar mixture of cobalt diacetate tetrahydrate and sodium bromide were dissolved in 400 mL of a 4:1 volume mixture of dimethoxyethane and acetic acid at 60° C., and sufficient $O_2$ was bubbled through the resultant solution to saturate the solution in oxygen. The percentage of conversion of the methyl groups to the corresponding aldehyde and carboxylic acid was determined at several intervals after the onset of the oxygen began, using NMR, IR and GPC. The results are set forth in the following table:

| Time from onset (hrs.) | MW | % Alde.[1] | % Carb.[2] | % Total oxid.[3] |
|---|---|---|---|---|
| 2 | 11,800 | 5 | 1 | 6 |
| 3 | 10,600 | 7.5 | 3.5 | 11 |
| 4 | 10,000 | 9 | 4 | 13 |
| 6 | 8,700 | 11 | 14 | 25 |
| 7 | 8,400 | 12 | 15 | 27 |

[1]Percent conversion of 4-methyl groups to —C(O)H.
[2]Percent conversion of 4-methyl groups to —C(O)OH.
[3]Total oxidation = the sum of the percent conversions to —C(O)H and —C(O)OH.

These results indicate that the conditions selected were effective to oxidize the benzylic methyl groups. They also indicate that the degree of oxidation increases with increasing duration of the reaction.

EXAMPLE 2

A series of runs were carried out in which 1.0 gram of poly(4-methylstyrene) (MW=13,590 g) and 0.1 grams of a cobalt (II) diacetate tetrahydrate/sodium bromide catalyst (having a NaBr:Co mole ratio set forth in the following table) were dissolved in a mixture of 43 mL of dimethoxyethane and 12 mL glacial acetic acid at 60° C., and sufficient $O_2$ was bubbled through the solution to saturate the solution in oxygen. These conditions were maintained for 3 hours, followed by direct precipitation into water and reprecipitation from dimethoxyethane into water. The conversion of the benzylic methyl to aldehyde and carboxylic acid was measured by $^1$H-NMR and by UV-Vis. The results are set forth in the following table.

| Mole ratio, NaBr:Co | % Alde. | % Carb. | % Total oxid. | MW[4] | PD[5] | Yield, % |
|---|---|---|---|---|---|---|
| 0* | 0 | 0 | 0 | 13100 | 1.65 | 95 |
| 1:10 | 3.3 | 1.6 | 5 | 12800 | 1.62 | 96 |
| 1:2 | 5.9 | 4.1 | 10 | 11300 | 1.66 | 91 |
| 1:1 | 9.5 | 4.4 | 14 | 12200 | 1.56 | 82 |
| 5:1 | 3.1 | <0.5 | 3.1 | 13200 | 1.61 | 97 |
| 10:1 | 3.5 | <0.5 | 3.5 | 13300 | 1.65 | 82 |

(*: 0.1 g of CO(II) diacetate, no sodium bromide)
[4]Number average molecular weight, $M_n$
[5]Polydispersity, ($M_w/M_n$)

These data indicate that the fastest oxidation occurs at a Co:Br ratio of about 1:1. It can also be seen that the ratio of aldehyde functionality to carboxylic acid functionality produced in the reaction varies with the Br:Co ratio. This feature can be used to advantage in tailoring the reaction conditions for the production of a particular desired end-product.

As the molecular weight data indicate, the precursor polymer undergoes some cleavage during the oxidation process. However, it has been determined that the selectivity for oxidation at the benzylic carbon over oxidative cleavage on the backbone is on the order of 25:1 to about 30:1, or higher, so the conditions under which the disclosed process is carried out can readily be adjusted to provide the molecular weight desired for many oxidized polymeric products notwithstanding the cleavage that occurs during the oxidation reaction.

EXAMPLE 3

Four series of runs were carried out in which 8.0 g of poly(4-methylstyrene) (MW=13,600 g) and 0.8 of a 1:1 molar mixture of cobalt (II) diacetate tetrahydrate and sodium bromide were dissolved in a mixture of 300 mL of dimethoxyethane and 80 mL of glacial acetic acid, and sufficient $O_2$ was bubbled through the solution to saturate the solution in oxygen. Series were carried out at 40° C., at 60° C., at 80° C. and at 90° C. Aliquots containing about 1 gram of polymer were withdrawn at various points in time following the onset of the oxygen injection. The results are set forth in the following table:

| Temp. °C. | Time after onset(hr) | % Ald. | % Carb. | % Total oxid. | Yield % | MW | PD |
|---|---|---|---|---|---|---|---|
| — | 0 | — | — | — | — | 13,600 | 1.694 |
| 40 | 30 | 14.8 | 43.3 | 58.1 | 89 | 6,700 | 1.61 |
| 40 | 46 | 10.9 | 53.5 | 64.4 | 91 | 6,000 | 1.59 |
| 40 | 108 | 10.2 | 57.0 | 67.2 | 95 | 5,300 | 1.58 |
| 60 | 2 | 4.9 | 0.84 | 5.8 | 87 | 11,800 | 1.761 |
| 60 | 3 | 7.6 | 3.3 | 10.9 | 93 | 10,600 | 1.808 |
| 60 | 4 | 8.9 | 4.1 | 13.0 | 94 | 10,000 | 1.796 |
| 60 | 6 | 10.9 | 14.1 | 25.0 | 82 | 8,700 | 1.753 |
| 60 | 7 | 11.4 | 14.8 | 26.2 | 94 | 8,400 | 1.772 |
| 80 | 0.5 | 4.0 | <0.5 | 4.0 | 93 | 13,100 | 1.72 |
| 80 | 1 | 7.2 | 1.4 | 8.6 | 90 | 11,950 | 1.75 |
| 80 | 1.5 | 8.3 | 2.9 | 11.2 | 97 | 10,800 | 1.69 |
| 80 | 2 | 9.0 | 7.0 | 16.1 | 95 | 10,800 | 1.72 |
| 80 | 2.5 | 10.6 | 14.3 | 24.9 | 91 | 10,100 | 1.73 |
| 80 | 3 | 11.8 | 15.3 | 27.1 | 94 | 9,300 | 1.69 |
| 90 | 0.5 | 2.3 | <0.5 | 2.3 | 83 | 13,600 | 1.719 |
| 90 | 1 | 3.2 | <0.5 | 3.2 | 93 | 13,000 | 1.835 |
| 90 | 1.5 | 2.9 | <0.5 | 2.9 | 97 | 13,300 | 1.723 |
| 90 | 2 | 2.9 | <0.5 | 2.9 | 94 | 12,700 | 1.803 |
| 90 | 2.5 | 2.7 | <0.5 | 2.7 | 87 | 12,800 | 1.844 |
| 90 | 3 | 3.7 | <0.5 | 3.7 | 85 | 12,600 | 1.568 |

These results indicate a general increase in the rate of oxidation with increasing temperature. The results at 90° C. show the effect of operating at too high a temperature such that insufficient oxygen dissolves in the solvent system to permit oxidation to proceed.

EXAMPLE 4

A series of runs were carried out in which 10.0 g of poly(4-methylstyrene) (MW=14,600 g, PD=1.71) and varying amounts of a catalyst comprising a 1:1 molar mixture of cobalt (II) diacetate tetrahydrate and sodium bromide were dissolved in a mixture of 420 mL dimethoxyethane and 60 mL glacial acetic acid at 80° C., and sufficient $O_2$ was bubbled through the reaction solution to saturate the solution in oxygen. The progress of the oxidation was determined 3 hours following the onset of oxygen injection. The results are set forth in the following table:

| Co:Polymer (Molar) | % Alde. | % Carb. | % Total oxid. | Yield % | MW | PD |
|---|---|---|---|---|---|---|
| 0.10 | 10.4 | 20.4 | 30.8 | 94 | 8,800 | 1.67 |
| 0.075 | 11.0 | 15.8 | 26.8 | 96 | 9,200 | 1.78 |
| 0.05 | 7.4 | 5.5 | 12.9 | 94 | 11,200 | 2.00 |
| 0.025 | 6.4 | 2.6 | 9.0 | 93 | 12,200 | 2.26 |
| 0.01 | nil | nil | nil | 99 | 13,400 | 1.94 |

These results demonstrate that the degree of oxidation increases with increasing catalyst concentration (since the Br concentration also increased with the increasing Co:Polymer value).

EXAMPLE 5

A series of runs were carried out in which poly(4-methylstyrene) (MW=14,600; PD=1.71) and a catalyst comprising a 1:1 molar mixture of cobalt (II) diacetate tetrahydrate and sodium bromide (catalyst=2.5 wt. % based on the precursor polymer) were dissolved in a mixture of glacial acetic acid and dimethoxyethane, in which the proportion of acetic acid was varied. The solution was held at 80° C. and $O_2$ was bubbled through the reaction solution to saturate the solution in oxygen. After 3 hours, the conversion to oxidized functionalities was measured. The results are set forth in the following table:

| HOAc, Vol. % | % Alde. | % Carb. | % Total oxid. | Yield % | MW | PD |
|---|---|---|---|---|---|---|
| 21.0 | 9.3 | 9.4 | 18.7 | 94 | 9,900 | 1.73 |
| 12.5 | 6.4 | 2.6 | 9.0 | 93 | 13,000 | 1.68 |
| 5.0 | 2.6 | 3.9 | 6.5 | 92 | 12,000 | 1.70 |

These results indicate that the total oxidation increases with increasing concentration of the acetic acid, the co-solvent for the catalyst in the reaction system.

Separately, it was determined that the rate of oxidation in a 50:50 mixture of acetic acid: co-solvent increases in the order dimethoxyethane, butanone, heptane.

EXAMPLE 6

Several examples of narrow disperse AB-type block copolymers of styrene and 4-methylstyrene (MW=26,800; MWD=1.1) prepared by living anionic polymerization were dissolved in a 1:1 molar mixture of methyl ethyl ketone and glacial acetic acid together with 10 wt. % (based on the polymer weight) of a 1:1 molar mixture of cobalt (II) diacetate tetrahydrate and sodium bromide. This reaction solution was held at 80° C. and sufficient $O_2$ was bubbled through to saturate the solution in oxygen. The degree of oxidation of the benzylic methyl groups was determined at several points in time following the onset of oxygen injection. The results are set forth in the following table:

| Time (min) from onset | % Alde. | % Carb. Acid | % Total Oxid. | MW |
|---|---|---|---|---|
| 7.5 | 2 ± 1 | 2 ± 1 | 4 ± 2 | 26,100 |
| 15 | 3 ± 1 | 2 ± 1 | 5 ± 2 | 25,900 |
| 20 | 7 ± 1 | 4 ± 1 | 11 ± 2 | 23,900 |
| 25 | 6 ± 1 | 6 ± 1 | 12 ± 2 | 24,500 |

Another aspect of the present invention is the application of the oxidation technique described herein to polymers having any of the structures described herein for the precursor polymers but lacking oxidizable benzylic carbon sites. Examples include polymers of repeating units —($CH_2CHZ^1$)— and/or —($CH_2CZ^1Z^2$)— as defined herein, especially polystyrene, polyethylene, polyvinylchloride, and polyacrylics. Reacting such a polymer with oxygen in solution with catalytic cobalt(II) and halide, employing the conditions taught herein, forms terminal —COH, —C(O)R and —COOH on the ends (typically both ends) of the polymer; also, the polymer undergoes some cleavage, and said oxidic groups are formed on the ends of the resulting chains. If desired, the oxidic groups can be reduced to —$CH_2OH$ via reduction with e.g. lithium aluminum hydride.

Polymers having such end groups, whether or not they are further reduced to —$CH_2OH$ groups, have many uses. In particular, they are useful as cross-linking agents and as agents for incorporation (via e.g. amidation or esterification reactions) into block copolymers having usefulness in the types of products enumerated above. For example, the —$CH_2$ OH groups can advantageously be reacted with methacryloyl chloride or chloromethylstyrene to provide, respectively, methacrylic ester or styrene end groups, whose ethylenic unsaturation makes them useful as cross-linking agents that could be incorporated into mixtures of monomers or comonomers prior to polymerization.

It is a significant advantage of the present invention that the products of the catalytic oxidation process described herein, which are themselves useful in a wide variety of applications, can be further converted into derivatives which are also useful.

For instance, when it is desired to adjust the ratio of aldehyde and carboxylic acid functionalities produced on a polymer by the catalytic oxidation described herein, the polymer can be reacted in solution with an oxidizing system such as hydrogen peroxide or chromic acid salts to convert aldehyde functionalities to additional carboxylic acid functionalities.

Polymers produced as described herein having carboxylic acid functionality can be rendered water-soluble by reaction with a base such as sodium or potassium hydroxide, carbonate or bicarbonate. The resulting derivatized polymers are thus substituted on the phenyl rings with —C(O)O(Cat) groups, wherein (Cat) is an alkali metal cation. For instance, polymers of 4-methylstyrene of molecular weight approximately 10,000 having over about 35% conversion of the 4-methyl groups to carboxylic acid functionality can be rendered water soluble by reaction with aqueous sodium hydroxide. Such solubilized polymers are considered within the scope of the present invention.

For instance, polymers in accordance with the foregoing description having aldehyde (that is, —C(O)H) functionality can be reacted with e.g. sodium borohydride under conventional reducing conditions to convert the aldehyde functionality to hydroxymethyl functionality —$CH_2OH$. This reduction proceeds even when carboxylic acid functionality is also present on the polymer, and leaves the carboxylic acid functionality intact. Alternatively, the oxidized polymer containing aldehyde functionality, carboxylic acid functionality, or both types of functionalities, can be reacted with metal hydride, such as lithium aluminum hydride, under conventional reducing conditions to convert aldehyde and carboxylic acid functionalities to the corresponding hydroxymethyl functionality. Alternatively, one can esterify the carboxylic groups, then reduce the esters and any aldehyde functionalities present to the corresponding hydroxymethyl functionality with borane reducing agents.

The aldehyde, carboxylic acid and/or hydroxymethyl groups which can thus be provided on the polymers of the present invention provide useful sites for a number of reactions that can produce other useful products.

For instance, reaction of the hydroxymethyl groups with acetyl chloride or acetic anhydride produces acetoxymethyl-substituted polymers (e.g. styrenes) which may be useful as polymeric photo resist materials and are susceptible to acid catalyzed crosslinking. Also, the hydroxymethyl groups can be reacted with thionyl chloride to produce poly-(chloromethylstyrene). This polymeric material enjoys a wide variety of utilities, based on the reactivity of the chloro substituent., The process described herein provides a highly preferred substitute for previous processes involving chloromethylation of polystyrene with chloromethylmethylether, a hazardous substance. In addition, the hydroxymethyl-substituted polymers can serve as the polyol reagent used in the production of polyurethanes.

In addition, the reactivity of the aldehyde and carboxylic acid functionalities with $NH_3$ and with primary or secondary amines or imines can be used to advantage to form additional useful products. In particular, the polymers formed as described herein (especially when formed from lightly crosslinked i.e. about 2% cross-linked polymer) would be useful as supports for peptide synthesis via the well-known "Merrifield" synthetic technique.

Polymers in accordance with the present invention may also take the form of beads, porous and non-porous microspheres, and sheets such as films and membranes. Preferably the precursor polymer (preferably cross-linked except in the case of sheets such as films and membranes) is prepared in the desired form, and then subjected to catalytic oxidation as taught herein. The oxidation in accordance with the present invention can produce materials useful as for instance, chromatographic supports and microfilters. The addition of the polar groups enhances the selectivity, reduces the tendency for fouling, and also provides reactive sites for the covalent attachment of additional groups to further modify the chromatographic, filtration or other properties of the material. By "sheets" is meant products whose width and length are substantially greater (i.e. each more than 10 times greater) than their thickness.

Preparation of such a membrane by phase inversion is described in the following example:

EXAMPLE 7

HPLC grade $H_2O$ (300mL), and poly(vinyl alcohol) (80% hydrolyzed, $M_n$ 10,000) (0.50 g) were added to a 1000 ml, 3-neck, water-jacketed, overhead stirred reaction vessel. The temperature was increased to 50° C. and the mixture was stirred until all of the poly (vinyl alcohol) was dissolved. The temperature was lowered to 25° C. 4-Methylstyrene (50 mL, 44.8 g, 0.379 mol) and 2,2'-azobisisobutyronitrile (AIBN) (0.50 g, 0.0031 mol) were placed in a 100 mL Erlenmeyer flask and stirred until all the initiator was dissolved. This mixture was placed into the reaction vessel, to which was added a nitrogen inlet and condenser. The system was purged and kept under $N_2$ and stirred at 500 rpm while the temperature was raised to 70° C. Reaction proceeded for 24 hours, at which point the system was allowed to cool to 25° C. while being stirred. The resulting polymer beads were filtered and washed with absolute ethanol. They were then dissolved in 500 mL methylene chloride and precipitated into 4L of absolute ethanol. (Yield=38.4 g(86%); $M_n$=135,000; PD=4.00)

Poly(4-methylstyrene) (25 g, $M_n$=135,000) was placed in a 250 mL Erlenmeyer flask along with 125 mL of THF and dissolved by gently stirring for approximately 24 hours. A homogeneous, honey-like solution resulted. This was poured onto a smooth, clean piece of glass (dimensions 9"×9"). The viscous polymer solution was drawn into a thin film with an adjustable membrane casting knife set to 500 microns. The membrane casting knife consisted of a blade which could be raised by a micrometer to permit polymer solution to flow underneath. The THF was allowed to evaporate from the polymer solution, resulting in a clear film of poly (4-methylstyrene). This film was placed in a bath of hot water and 'peeled' from the surface of the glass.

The method described in the preceding paragraph was used to prepare a thin film of polymer solution on a glass plate. At this point, the glass plate was immediately placed into a bath of room temperature absolute ethanol, and left for 2 hours. The white, microporous membrane peeled off the glass plate by itself, and after 2 hours the membrane was removed from the ethanol and allowed to air dry on a flat surface.

150 mL of Iso-propyl alcohol, 150 mL of glacial acetic acid, 3 g of cobalt (II) diacetate tetrahydrate and 1.5 g of NaBr were mixed in a 500 ml three-necked round-bottomed flask. Small pieces of poly(4-methylstyrene) membrane and film prepared in accordance with this Example were separately wrapped in two layers of cotton cheesecloth, then placed into this flask. A gas sparger supplying $O_2$ at 0.5 L/min was added to this system which was stirred rapidly at 40° C. for 24 hours. At the conclusion of the reaction, the membrane was removed and washed with distilled water for 1. hour, then vacuum dried for 24 hours at 70° C. Fourier-Transform Infrared (FT-IR) analysis showed that the treated surface of the membrane and film contained aldehyde and carboxylic acid groups. Such a membrane is useful in e.g. dewatering applications, for instance to remove water from latex emulsions thereby taking advantage of the repulsive forces between carboxylic acid anions on the membrane and anionic latex particles.

Similarly, polymer beads made of linear or crosslinked poly(4-methylstyrene) or other polymers as described herein, and oxidized by the selective oxidation process described herein, would be useful in a number of applications including but not limited to ion exchange resins, hydrophilic or otherwise chemically modified chromatography resins, and as microparticulate carriers for enzymes and proteins in biodiagnostics. For example, primary amino residues of enzymes or proteins may be effiently bonded to the aldehyde groups produced in the selective oxidation of poly(4-methylstyrene) microspheres.

EXAMPLE 8

To demonstrate the ability of the process of the present invention to cleave a polymeric backbone in the absence of primary benzylic groups, thereby presenting the possibility of forming telechelic polymers, 4.12 g (0.05 mol) of homopolymeric polystyrene ($M_n$=210,000; $M_w/M_n$=1.12) was reacted with 0.005 mol of 1:1 NaBr/Co(Ac)$_2$.4H$_2$O in an acetic acid/dioxane mixture (volume ratio=1:1.5) at 80° C. in two different runs. The molecular weights ($M_n$) and the percentage of molecular weight reduction (% MW Reduct.) were measured at intervals following the onset of the reaction and are set forth below:

| | Min. from onset | $M_n$/1,000 | % MW Reduct |
|---|---|---|---|
| Run A: | | | |
| | 30 | 17.4 | 92 |
| | 45 | 10.9 | 95 |
| | 60 | 8.5 | 96 |
| | 75 | 7.6 | 96 |
| | 90 | 6.8 | 97 |
| | 150 | 2.6 | 98 |
| | 240 | 1.9 | 99 |
| | 360 | 1.3 | 99 |
| Run B: | | | |
| | 5 | 51.4 | 76 |
| | 10 | 32.6 | 84 |
| | 15 | 23.9 | 89 |
| | 30 | 13.8 | 93 |
| | 240 | 1.85 | 99 |
| | 330 | 1.35 | 99 |
| | 360 | 1.3 | 99 |
| | 420 | 1.07 | 99.5 |

What is claimed is:

1. A process for selectively oxidizing benzylic carbon atoms in a precursor polymer containing benzylic carbon atoms, wherein said benzylic carbon atoms are pendant from phenyl rings which are in the backbone of said precursor polymer, comprising reacting oxygen with said precursor polymer and an effective amount of a catalyst for said oxidation, under conditions effective to oxidize a portion of said benzylic carbon atoms to —C(O)H and a portion of said benzylic carbon atoms to —C(O)OH.

2. The process of claim 1 wherein said benzylic carbon atoms are primary or secondary benzylic carbon atoms.

3. The process of claim 1 wherein said precursor polymer is a homopolymer.

4. The process of claim 1 wherein said precursor polymer is a copolymer.

5. The process of claim 4 wherein said precursor polymer is a block copolymer.

6. The process of claim 1 wherein said backbone contains repeating phenoxy units.

7. The process of claim 6 wherein said backbone contains repeating 2,6-dimethylphenoxy units.

8. A process in accordance with claim 1, further comprising subsequently oxidizing at least a portion of said —C(O)H to —C(O)OH.

9. A process comprising oxidizing benzylic carbon atoms to —C(O)H in accordance with claim 1 and then reducing said —C(O)H to —CH$_2$OH.

10. A process comprising oxidizing benzylic carbon atoms to —COOH in accordance with claim 9 and then reducing said —COOH to —CH$_2$OH.

11. A process comprising oxidizing benzylic carbon atoms to —C(O)H and —COOH in accordance with claim 1 and then reducing said —C(O)H and —COOH to —CH$_2$OH.

12. A process according to claim 1 wherein the molecular weight of said precursor polymer is at least about 1,000.

13. A process according to claim 1 wherein at least about 10% of said benzylic carbon atoms are oxidized.

14. The process of claim 1 wherein said catalyst comprises ions of cobalt and a material selected from the group consisting of bromide ions, chloride ions, and zirconium tetra(acetoacetate).

15. The process of claim 1 wherein said catalyst comprises cobalt (II) bromide.

16. The process of claim 1 wherein said catalyst comprises one or more compounds selected from the group consisting of cobalt (II) acetate, cobalt (II) chloride, cobalt (II) nitrate, and cobalt (II) sulfate, and further comprises one or more compounds selected from the group consisting of sodium and potassium halides and zirconium tetra(acetoacetate).

17. A process according to claim 1 wherein said precursor polymer and said catalyst are dissolved in a mixture of one or more alkanoic acids containing up to 6 carbon atoms and a co-solvent selected from the group consisting of dimethoxyethane, ketones, ethers and alkanes.

* * * * *